US011514538B2

(12) United States Patent
Chen

(10) Patent No.: US 11,514,538 B2
(45) Date of Patent: Nov. 29, 2022

(54) RESTAURANT, AND ORDER INFORMATION PROCESSING METHOD AND APPARATUS

(71) Applicant: ALIBABA GROUP HOLDING LIMITED, Grand Cayman (KY)

(72) Inventor: Yuan Chen, Hangzhou (CN)

(73) Assignee: ALIBABA GROUP HOLDING LIMITED, George Town (KY)

( * ) Notice: Subject to any disclaimer, the term of this patent is extended or adjusted under 35 U.S.C. 154(b) by 222 days.

(21) Appl. No.: 16/858,442

(22) Filed: Apr. 24, 2020

(65) Prior Publication Data

US 2020/0258139 A1 Aug. 13, 2020

Related U.S. Application Data

(63) Continuation of application No. PCT/CN2018/111175, filed on Oct. 22, 2018.

(30) Foreign Application Priority Data

Oct. 31, 2017 (CN) .......................... 201711051668.9

(51) Int. Cl.
*G06Q 30/06* (2012.01)
*G06Q 50/04* (2012.01)
(Continued)

(52) U.S. Cl.
CPC ....... *G06Q 50/12* (2013.01); *G06K 19/06037* (2013.01); *G06Q 30/0633* (2013.01); *G06Q 50/04* (2013.01); *G06Q 10/0836* (2013.01)

(58) Field of Classification Search
CPC ............. G06Q 10/083; G06Q 10/0836; G06Q 10/087; G06Q 30/0633–0635;
(Continued)

(56) References Cited

U.S. PATENT DOCUMENTS 6,170,630 B1 * 1/2001 Goss ...................... B65G 37/02
198/346.2
6,954,736 B2 10/2005 Menninger et al.
(Continued)

FOREIGN PATENT DOCUMENTS

CN 102999879 A 3/2013
CN 203376783 U 1/2014
(Continued)

OTHER PUBLICATIONS

The weird restaurant where your food comes in a BOAT floating down a stream Truman, Peter. Daily Star (Online). Nov. 22, 2016. (Year: 2016).*
(Continued)

*Primary Examiner* — William J Allen

(57) ABSTRACT

Methods, systems, and apparatus, including computer programs encoded on computer storage media, for processing order information are provided. One of the methods includes: receiving, by a server from a first client associated with a user, a request for generating an order, the request comprising identification information of a food establishment, identification information of the user, and information of a selected data object; generating, by the server, the order based on the request; sending, by the server, the order to a second client associated with a processing and preparing area of the food establishment; generating, by the server, a geometric code encoding identification information of the generated order; and sending, by the server to a third client associated with a raw material storage area of the food establishment, the generated geometric code and the information of the selected data object.

16 Claims, 15 Drawing Sheets

(51) Int. Cl.
*G06Q 50/12* (2012.01)
*G06Q 10/08* (2012.01)
*G06K 19/06* (2006.01)

(58) Field of Classification Search
CPC ........ G06Q 50/04; G06Q 50/12; A46F 10/06;
A47F 10/06; B65C 1/00–047; B65C 9/00;
B65C 9/08; B65C 2009/0003; B65C
2009/0018; B65D 1/22; B65D 1/26;
B65G 47/00; B65G 47/02–088; B65G
47/16; B65G 47/22; B65G 47/261; B65G
47/34; B65G 47/5136; B65G 47/5154;
B65G 47/5172
See application file for complete search history.

(56) References Cited

U.S. PATENT DOCUMENTS

| | | | |
|---|---|---|---|
| 7,072,843 B2 | 7/2006 | Menninger et al. | |
| 7,171,379 B2 | 1/2007 | Menninger et al. | |
| 7,546,257 B2 | 6/2009 | Hoffman et al. | |
| 7,797,204 B2 | 9/2010 | Balent | |
| 7,917,439 B2 | 3/2011 | Barnes, Jr. | |
| 8,897,820 B2 | 11/2014 | Marovets | |
| 8,970,733 B2 | 3/2015 | Faenger | |
| 9,117,231 B2 | 8/2015 | Rodgers et al. | |
| 9,311,656 B2 | 4/2016 | Barnes, Jr. | |
| 9,715,704 B2 | 7/2017 | Itwaru | |
| 9,953,363 B2 | 4/2018 | Riddiford et al. | |
| 10,304,147 B2 | 5/2019 | Kelly et al. | |
| 10,373,223 B2 | 8/2019 | Carroll et al. | |
| 2002/0056751 A1* | 5/2002 | Lee .................. | A47F 10/06 235/462.01 |
| 2002/0085025 A1* | 7/2002 | Busis ................ | G06Q 30/06 715/738 |
| 2004/0111321 A1* | 6/2004 | Kargman ........... | G06Q 30/02 705/16 |
| 2009/0101445 A1* | 4/2009 | Mack ................ | A47F 10/06 186/38 |
| 2011/0258058 A1 | 10/2011 | Carroll et al. | |
| 2016/0048824 A1 | 2/2016 | Ogilvy | |
| 2016/0241415 A1 | 8/2016 | Han | |
| 2016/0244311 A1* | 8/2016 | Burks ................ | B67D 1/0888 |
| 2016/0275470 A1 | 9/2016 | Straw et al. | |
| 2017/0202385 A1* | 7/2017 | Ishino .............. | A47F 10/06 |
| 2017/0365017 A1* | 12/2017 | Ells .................. | G06Q 20/3278 |
| 2019/0019260 A1* | 1/2019 | Medam ............. | H04W 4/021 |
| 2019/0172050 A1 | 6/2019 | Winters et al. | |
| 2019/0318442 A1 | 10/2019 | Lutnick et al. | |
| 2020/0031592 A1* | 1/2020 | Ogawa .............. | B65G 37/00 |

FOREIGN PATENT DOCUMENTS

| | | |
|---|---|---|
| CN | 104036439 A | 9/2014 |
| CN | 104751381 A | 7/2015 |
| CN | 105335911 A | 2/2016 |
| CN | 105338862 A | 2/2016 |
| CN | 105825378 A | 8/2016 |
| CN | 205845185 U | 12/2016 |
| CN | 106707879 A | 5/2017 |
| CN | 106843176 A | 6/2017 |
| CN | 207637200 U | 7/2018 |
| JP | H6-251227 A | 9/1994 |
| JP | 2002-276176 A | 9/2002 |
| JP | 2004-89561 A | 3/2004 |
| JP | 2004-318324 A | 11/2004 |
| JP | 2009-519388 A | 5/2009 |
| JP | 2011-234880 A | 11/2011 |
| JP | 2016-533133 A | 10/2016 |
| JP | 3211226 U | 6/2017 |

OTHER PUBLICATIONS

Office Action for Japanese Application No. 2020-524278 dated Jul. 13, 2021.
Written Opinion and International Search Report for PCT Application No. PCT/CN2018/111175 dated Jan. 30, 2019.
International Preliminary Report on Patentability Chapter I for PCT Application No. PCT/CN2018/111175 dated May 14, 2020.
First Search for Chinese Application No. 201711051668.9 dated Sep. 26, 2022.

* cited by examiner

_US 11,514,538 B2_

RESTAURANT, AND ORDER INFORMATION PROCESSING METHOD AND APPARATUS

CROSS-REFERENCE TO RELATED APPLICATIONS

This application is a continuation application of International Application No. PCT/CN2018/111175, filed on Oct. 22, 2018, which is based on and claims priority to and benefits of Chinese Patent Application No. 201711051668.9, filed with the China National Intellectual Property Administration on Oct. 31, 2017. The entire contents of the above-identified applications are incorporated herein by reference.

TECHNICAL FIELD

The present specification relates to the field of food establishment information processing technology, and in particular, to a food establishment and an order information processing method and apparatus.

BACKGROUND

In a modern society with rapid development in all aspects, a sharp contradiction is seen between the increasing pacing of work and life and people's pursuit of a high-quality life. For example, in terms of dining services, on the one hand, people asks for a fast service to avoid being late for work, etc.; on the other hand, people pursue high quality, fresh ingredients, and so on. In the existing dining service industry, however, fast-food service providers generally process and prepare food in batches in advance, and thus the freshness of ingredients and finished products cannot be guaranteed. On the other hand, although traditional dining service providers can guarantee the freshness of ingredients to some extent and can process and prepare the dishes after receiving a user's order, the waiting time varies, which is especially the case during crowded dining time when a waiting time tends to be longer.

In summary, in the current technologies, when choosing dining services, people generally can only select either speedy services or fresh food, and having both seems to be a challenge. Therefore, how to enable dining service providers to better provide both speedy services and fresh food has become a technical problem that needs to be addressed by those skilled in the art.

SUMMARY

The present specification provides a food establishment and an order information processing method and apparatus, which can enable dining service providers to better achieve both speed and freshness.

The present specification provides the following embodiments.

A food establishment, comprising:
a raw material storage area located in a user activity area comprising at least a first container for storing raw materials for selection;
a processing and preparing area, used for processing and preparing selected raw materials; and
a conveyor device, located between the raw material storage area and the processing and preparing area, and used for conveying the selected raw materials from the raw material storage area to the processing and preparing area.

A food establishment, comprising:
a raw material storage area located in a user activity area comprising at least a first container for storing raw materials for selection;
a processing and preparing area, used for processing and preparing selected raw materials, wherein
the user activity area is located around the raw material storage area, and the processing and preparing area is located around the user activity area.

An order information processing method, comprising:
receiving, by a server, a request for generating an order;
generating an order according to information in the request, wherein the order comprises identification information of an associated physical food establishment, identification information of a user, and information of a selected data object;
providing the order to a second client in a processing and preparing area of the physical food establishment; and
generating a geometric code corresponding to the order and providing the same to a third client in a raw material storage area of the physical food establishment.

An order information processing method, comprising:
determining, by a first client, information of a selected data object, wherein the data object information corresponds to a raw material for selection in a physical food establishment; and
submitting to a server a request for generating an order, wherein the request carries identification information of the physical food establishment, identification information of a user associated with the first client, and the information of the selected data object, all of which is used for generating an order.

An order information processing method, comprising:
receiving, by a second client, detailed information of an order pushed by a server, wherein the second client is a client associated with a processing and preparing area in a physical food establishment; and the detailed information of an order comprises at least order identification information and information of a selected data object, wherein the data object corresponds to a raw material stored in a first container in a raw material storage area of the physical food establishment; and after the data object is selected, a corresponding raw material is contained by a second container and conveyed by a conveyor device to a processing and preparing area of the physical food establishment so as to be made into a finished product, wherein the second container further comprises a label, and the label comprises a geometric code carrying the order identification information;
obtaining the order identification information by scanning the geometric code on the second container; and
determining, according to the order identification information, detailed information of an associated target order from the information pushed by the server.

An order information processing method, comprising:
obtaining, by a second client, user identification information and information of a selected data object; and
submitting, according to identification information of a physical food establishment associated with the second client, the user identification information, and the information of a selected data object, to a server a request for generating an order, such that the request can be used to generate an order, and providing the order to a processing and preparing area of the physical food establishment.

An order information processing apparatus, applicable to a server, comprising:
a request receiving unit, configured to receive a request for generating an order;

an order generating unit, configured to generate an order according to information in the request, wherein the order comprises identification information of an associated physical food establishment, identification information of a user, and information of a selected data object;

an order information providing unit, configured to provide the order to a second client in a processing and preparing area of the physical food establishment; and a geometric code generating unit, configured to generate a geometric code corresponding to the order and provide the same to a third client in a raw material storage area of the physical food establishment.

An order information processing apparatus, applicable to a first client, comprising:

a data object information determining unit, configured to determine information of a selected data object, wherein the data object information corresponds to a raw material for selection in a physical food establishment; and a request submitting unit, configured to submit to a server a request for generating an order, wherein the request carries identification information of the physical food establishment, identification information of a user associated with the first client, and the information of the selected data object, all of which is used for generating an order.

An order information processing apparatus, applicable to a second client, comprising:

an order information receiving unit, configured to receive detailed information of an order pushed by a server, wherein the second client is a client associated with a processing and preparing area in a physical food establishment; and the detailed information of an order comprises at least order identification information and information of a selected data object, wherein the data object corresponds to a raw material stored in a first container in a raw material storage area of the physical food establishment; and after the data object is selected, the corresponding raw material is contained by a second container and conveyed by a conveyor device to a processing and preparing area of the physical food establishment so as to be made into a finished product, wherein the second container further comprises a label, and the label comprises a geometric code carrying the order identification information;

an order identification obtaining unit, configured to obtain the order identification information by scanning the geometric code on the second container; and an order details determining unit, configured to determine, according to the order identification information, detailed information of an associated target order from the information pushed by the server.

An order information processing apparatus, applicable to a second client, comprising:

an information obtaining unit, configured to obtain user identification information and information of a selected data object; and a request submitting unit, configured to submit, according to identification information of a physical food establishment associated with the second client, the user identification information, and the information of a selected data object, to a server a request for generating an order, such that the request can be used to generate an order, and provide the order to a processing and preparing area of the physical food establishment.

A self-service pick-up machine, comprising an enclosed storage container, a dispensation controller, and a code scanner, wherein the enclosed storage container is configured to store, in an enclosed manner, a processed and prepared product associated with an order;

the code scanner is configured to scan a meal-pickup geometric code to obtain order information; and the dispensation controller is configured to dispense the product corresponding to the order according to the order information obtained by scanning via the code scanner.

A self-service pick-up machine, comprising an open storage container that comprises a plurality of storage areas; the storage area corresponds to a prompting device; and the self-service pick-up machine further comprises a controller and a code scanner, wherein the open storage container is configured to store, in an open manner, a processed and prepared product associated with a user's order;

the code scanner is configured to scan a meal-pickup geometric code to obtain order information; and the controller is configured to store user order identification information corresponding to the product placed in the storage area, and after the code scanner scans to obtain order information, control a prompting device associated with the storage area corresponding to the order information to issue prompt information.

A computer system, comprising:

one or more processors; and a memory associated with the one or more processors, wherein the memory is configured to store program instructions which, when read and executed by the one or more processors, perform the following operations:

receiving a request for generating an order;

generating an order according to information in the request, wherein the order comprises identification information of an associated physical food establishment, identification information of a user, and information of a selected data object;

providing the order to a second client in a processing and preparing area of the physical food establishment; and generating a geometric code corresponding to the order and providing the same to a third client in a raw material storage area of the physical food establishment.

In some embodiments, the specification provides a computer-implemented method for processing order information. The method may include: receiving, by a server from a first client associated with a user, a request for generating an order, the request comprising identification information of a food establishment, identification information of the user, and information of a selected data object; generating, by the server, the order based on the request; sending, by the server, the order to a second client associated with a processing and preparing area of the food establishment; generating, by the server, a geometric code encoding identification information of the generated order; and sending, by the server to a third client associated with a raw material storage area of the food establishment, the generated geometric code and the information of the selected data object.

According to some embodiments, the specification provides a system for processing order information. The system may include a processor and a non-transitory computer-readable storage medium storing instructions executable by the processor to cause the system to perform operations. The operations may include receiving, from a first client associated with a user, a request for generating an order, the request comprising identification information of a food establishment, identification information of the user, and information of a selected data object; generating the order based on the request; sending the order to a second client associated with a processing and preparing area of the food establishment; generating a geometric code encoding identification information of the generated order; and sending, to a third client associated with a raw material storage area of the food establishment, the generated geometric code and the information of the selected data object.

In some embodiments, the specification provides a non-transitory computer-readable storage medium for processing order information, configured with instructions executable by one or more processors to cause the one or more processors to perform operations. The operations may include receiving, from a first client associated with a user, a request for generating an order, the request comprising identification information of a food establishment, identification information of the user, and information of a selected data object; generating the order based on the request; sending the order to a second client associated with a processing and preparing area of the food establishment; generating a geometric code encoding identification information of the generated order; and sending, to a third client associated with a raw material storage area of the food establishment, the generated geometric code and the information of the selected data object.

According to the specific embodiments provided by the present specification, the present specification discloses the following technical effects.

The embodiments of the present specification can improve a food establishment from its hardware layout by setting a raw material storage area in a user activity area, which offers a greater degree in raw material self-fetching, which in turn reduces the dependence on the staff members in the raw material storage area and shortens the waiting time. In addition, an automatic conveyor device is disposed between the raw material storage area and a processing and preparing area, such that the raw material selected by a user can be directly conveyed by the conveyor device to the processing and preparing area, which further reduces the dependence on staff members and helps to shorten the waiting time.

Naturally, implementing any product of this present specification does not necessarily need to achieve all the advantages described above at the same time.

BRIEF DESCRIPTION OF THE DRAWINGS

In order to more explicitly describe the technical solutions in the embodiments of the present specification or in the current technologies, the accompanying drawings according to the embodiments will be briefly introduced below. The accompanying drawings described below only represent some embodiments of the present specification. Those skilled in the art may still derive other accompanying drawings from these accompanying drawings without creative efforts.

DETAILED DESCRIPTION

Figure 1:
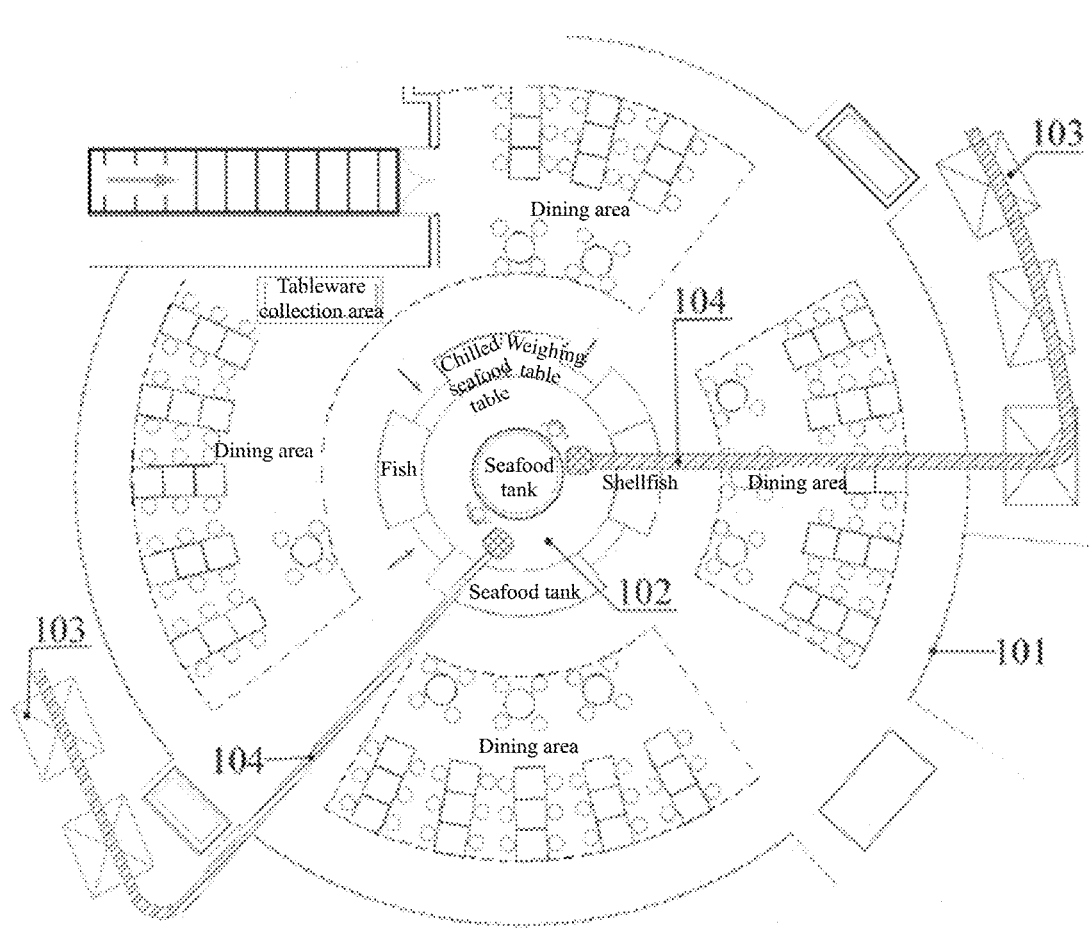
FIG. 1 shows a schematic diagram of a layout manner of a food establishment provided according to an embodiment of the present specification.

The technical solutions in the embodiments of the present specification will be clearly and completely described below with reference to the accompanying drawings given in the embodiments of the present specification. Apparently, the described embodiments are merely some but not all of the embodiments of the present specification. Based on the embodiments of the present specification, all other embodiments obtainable by those skilled in the art shall fall within the protection scope of the present specification.

In the process of implementing the present specification, one of the most difficult fields to cover in the existing fast-food services is the seafood area. This is because that users have the highest demand for the freshness of ingredients for seafood dining services; and seafood is thus generally prepared after a fish, crab, or a lobster is killed and processed on site. In the existing fast-food services, in order to ensure that users can quickly pick up a meal, seafood can only be pre-processed and pre-prepared in batches, which is not much approved by users; and if seafood is processed and prepared after an order is received from a user or after a user places an order after arrival at the food establishment, since the processing and preparation of seafood ingredients takes a longer time. As a result, corresponding services are generally only provided in traditional large and medium-sized food establishments; food establishments that provide fast-food type of dining generally does not provide seafood dining services. Used here in, a food establishment may refer to an operation that stores, prepares, packages, serves, vends, or otherwise provides food for human consumption. For example, a food establishment may be a restaurant, a satellite or catered feeding location, a catering operation, a market, a vending location, or any other suitable facilities for providing food or drinks. A food establishment may relinquish possession of food to a consumer directly, or indirectly through a delivery service such as home delivery of grocery orders or restaurant takeout orders, or delivery service that is provided by common carriers.

In view of the above-described situation, the embodiments of the present specification mainly focus on seafood dining services, with the object being providing users with faster and fresher dining services in the form of food establishments such as convenience stores and fast-food dining food establishments. Naturally, in practical applications, the solution may further be extended to other categories in addition to the dining category.

The solutions provided by the embodiments of the present specification may be first embodied in the construction of a hardware scene. Through the construction of the hardware scene, the time required for each step, from placing an ordering to fishing a crab or lobster out of a tank as well as processing and preparing ingredients, is shortened; freshness is increased; and the dependence on labor resources is reduced, thereby finally achieving an increase in speed while ensuring the freshness, such that the actual required time is within the time range that users are able to tolerate for fast-food food establishments and convenience stores. In addition, in a preferred embodiment, a corresponding information processing platform may further be set up based on the hardware scene to achieve information exchange among various areas and various processing and preparing steps, so as to further improve the efficiency and shorten the time.

Here, the construction of the hardware scene may be embodied in layout and devices. In terms of layout, firstly, as shown in FIG. 1, a raw material storage area 101 may be located in a user activity area 102, i.e., an area where a user such as a customer can enter. In this way, it is possible to offer users a greater degree in raw material self-fetching and selection, reduce the dependence on staff members, and shorten the waiting time for staff members. In addition, a conveyor device 104 may further be disposed between the raw material storage area 101 and a processing and preparing area 103. For example, it may be a conveyor device such as a suspension chain. In this way, the selected raw material from the raw material storage area 101 may be conveyed by the conveyor device to the processing and preparing area 103, which shortens the conveying time required for the raw material in the process, and so on. In addition, in a preferred embodiment, a raw material storage area may further be equipped with a device such as a mechanical arm, which can achieve operations such as fishing raw materials out of a tank, further reducing the dependence on on-site staff members. In another preferred embodiment, a processing and preparing area may further be divided into a plurality of sub-areas according to different processing modes. That is to say, in the embodiments of the present specification, the area is no longer divided according to the cuisine and the like as is the case in the traditional food establishments, but is divided according to the processing mode, for example, steaming, grilling, roasting, stir-frying, fishing, frying, baking, etc. In addition, processing devices may be introduced respectively for various processing modes, comprising a high-end steamer, oven, etc., so as to shorten the processing and preparing time, and so on.

There may be a plurality of embodiments for passing information. For example, in a simple manner, a staff member in a raw material storage area or a user may fill in information such as a required processing mode by hand on a label of a container such as a packaging bag for carrying a selected raw material; in addition, a container such as a packaging bag may further be equipped with an identification plate such as a "clip"; and the identification plate bears a serial number which can be remembered by the user. After the packaging bag is conveyed to the processing and preparing area, a staff member therein may determine, according to the information on the label, information such as a required processing mode; and after processing and preparation is completed, the staff member may notify the user to pick up his/her meal by broadcasting the serial number of the identification plate on site.

Figure 2:
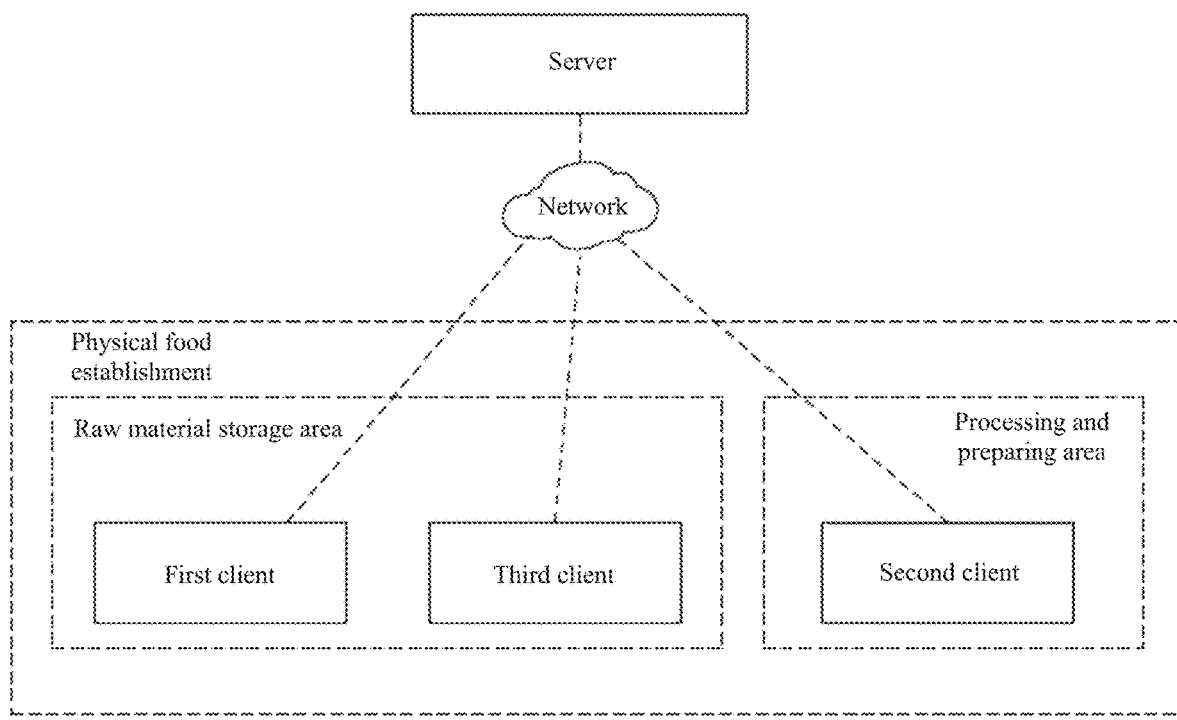
FIG. 2 shows a schematic diagram of an information processing architecture provided according to an embodiment of the present specification.

Although the above-described manner can achieve the goal of passing the information, the level thereof is low; and if the user's payment and other operations are completely performed offline, it will also cause another waiting, thus leading to longer time. Therefore, in a preferred embodiment, an information processing platform may further be provided, through which online order generation, payment, and transfer of related order information among various steps may be achieved. For example, as shown in FIG. 2, at an information processing level, a server may be comprised first. The server is generally located in the cloud and may uniformly manage order information for a plurality of physical food establishments. In addition, a first client may be provided for a user (a consumer user, a customer entering a physical food establishment, etc.); a second client may be provided for a processing and preparing area of a physical food establishment; additionally, a third client may further be provided for a raw material storage area of a physical food establishment, and so on. In this way, the user may determine data object information corresponding to the selected raw material by using the first client, and submit to the server a request for generating an order; alternatively, the user's identification information may be acquired and information such as the data object selected by the user may be determined by using the second client; and then a request for generating an order is submitted to the server. After receiving the request, the server may generate an order, and the user may complete operations such as payment based on the order. In addition, detailed information of the order may further be provided to the second client. Furthermore, identification information, such as a serial number, of an order may be provided to the third client. The third client may print a geometric code (e.g., barcode, QR code) carrying order identification information on a label by using an associated label printer, and adhere the label to a container containing the selected raw material. In this way, the third client may obtain specific order identification information by scanning the label, and then obtain specific order details according to the information provided by the server, including selected processing mode information, and so on.

The solutions provided by the embodiments of the present specification will be described in detail below from various different perspectives.

Embodiment 1

Figure 3:
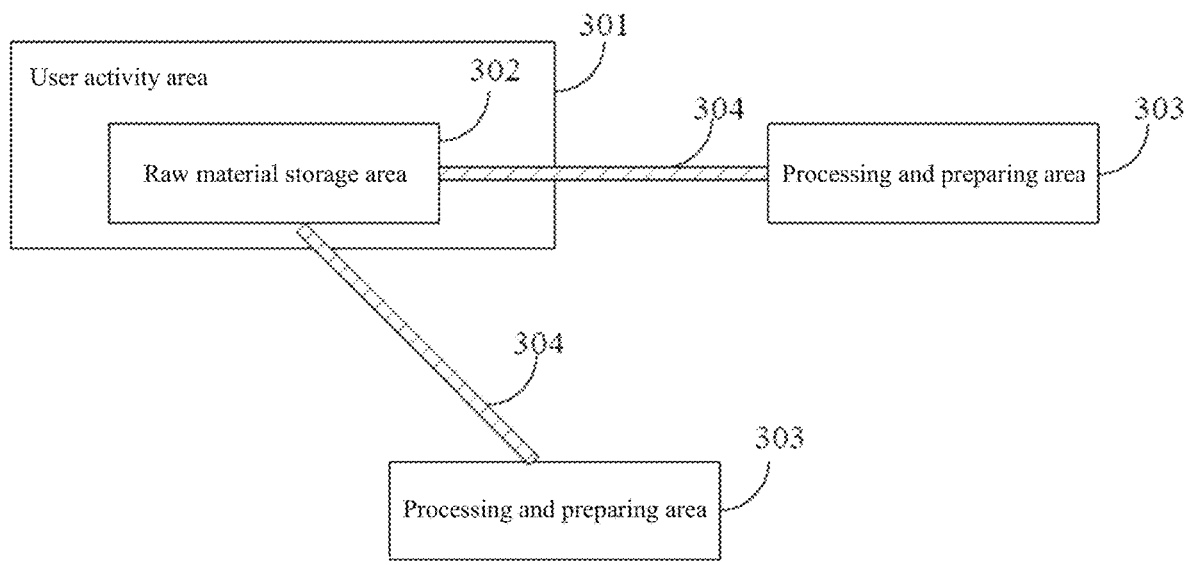
FIG. 3 shows a schematic diagram of a food establishment provided according to an embodiment of the present specification.

The Embodiment 1 first provides a food establishment, as shown in FIG. 3, and the food establishment may comprise:

a raw material storage area 302 located in a user activity area 301 that comprises at least a first container for storing raw materials for selection;

a processing and preparing area 303, used for processing and preparing selected raw materials; and a conveyor device 304, located between the raw material storage area and the processing and preparing area, and used for conveying the selected raw materials from the raw material storage area to the processing and preparing area.

Here, the so-called user activity area may refer to an area into which a user such as a customer can enter; the raw material may refer to ingredients like seafood and others; and the first container may refer to a fish tank, a refrigerator, etc., so as to keep ingredients fresh. The processing and preparing area may refer to an area into which a staff member such as a chef can enter, and may be equipped with a corresponding processing and preparing device. The conveyor device may be implemented using a plurality of specific forms such as a conveyor belt and a suspension chain. In a preferred embodiment, in order to provide an advantageous spatial layout, the conveyor device can be implemented as a suspension chain; that is, a ceiling conveying track may be disposed. Naturally, a vertically upward conveying track and the step may further be disposed between the raw material storage area and the ceiling.

In implementation, the raw material storage area may further comprise a second container for containing a selected raw material; and the conveyor device is configured to convey the second container containing the selected raw material to the processing and preparing area. Here, the so-called second container may refer to a plastic bag, or may refer to a basin, a bucket, etc., and may be connected with an accessory such as a hook for suspension onto a suspension chain for conveyance. Naturally, if a conveyor belt is adopted, the accessory such as a hook is not necessary.

Here, the raw materials are conveyed by an automatic transport device to the processing and preparing area, and different users may have different requirements for processing modes; categories and quantities of raw materials selected by each user may further differ; thus, some ways may be adopted to transfer the above-described information to the processing and preparing area. For example, a label may be adhered onto the second container. The label may bear a geometric code which carries order identification information; the geometric code is scanned so that the order identification information is provided to the processing and preparing area. Here, the so-called order may refer to an order generated after a user has selected a specific raw material and placed an order. An example for implementation is that the order may be generated by the server on the platform described above. Accordingly, the server may generate geometric code information based on the order identification information, and return the geometric code information to the third client in the raw material storage area. In this way, the third client may print the geometric code information on a label and adhere the label on the second container. The relevant implementation for generating an order will be introduced in detail later. Naturally, in practical applications, an order may further be placed in other ways. For example, an order may be generated according to an order processing system, such as an ERP (Enterprise Resource Planning) system, of a physical food establishment; and a geometric code may be generated based on an order identification and printed on a label, and so on. In addition, regardless of whether it is the server that generates an order or an in-food establishment ERP system that generates an order, detailed information of the order may be provided to the second client in the processing and preparing area. In this way, after the second container is conveyed to the processing and preparing area, a specific order identification may be obtained by scanning the geometric code on the label, thereby obtaining specific order details. Then, staff members in the processing and preparing area may obtain detailed information such as a processing mode corresponding to each of the respectively conveyed second container. Naturally, in implementation, the label may carry information such as a name of a specific raw material and the like.

In implementation, a plurality of steps may be provided in the processing and preparing area. For example, when a user selects a fish from the raw material storage area and requires that the fish be steamed for the step of processing and preparing, a staff member will need to remove the fish from the second container for pre-processing such as killing, scaling, gutting, and cleaning after the container reaches the processing and preparing area. Then, the fish may be contained by other containers such as a plate and handed over to a staff member responsible for finishing for flavoring, seasoning, etc., and finally placed in a tool such as a steamer for steaming. During the above various process steps, normally the second container may only reach a staff member responsible for pre-processing, and the pre-processed ingredients are moved to and contained by a different container; then the pre-processed ingredients are put into a tool such as a steamer for steaming. Therefore, without a special treatment, specific ingredients may still be indistinguishable after the containers are changed. In addition, since a printed label is generally made of paper, and most of related raw materials are seafood ingredients, it is inevitable that the label will be dampened with water, etc., and will thus be damaged. Therefore, such label has its disadvantage when being moved among different steps.

For this reason, in a preferred embodiment of the present specification, the second container may further be equipped with an electronic identification plate. After the second container is conveyed to the processing and preparing area, a third client may first bind information of the electronic identification plate with order identification information obtained by scanning the label. In this way, the information of the electronic identification plate may further be associated with a specific order; and even if the label on the second container is damaged subsequently, specific order information may still be determined by using the electronic identification plate. Here, the electronic identification plate may have characteristics such as waterproof and high-temperature resistance. Therefore, the electronic identification plate may be configured to move together with the raw materials to various steps in the processing and preparing area. For example, the electronic identification plate may be carried by an object such as a "clip", which may be initially clamped on the second container. After being conveyed to the processing and preparing area, the third client may scan the geometric code on the label on the second container to obtain order information, and may further read the information of the electronic identification plate, and bind the information of the electronic identification plate with information such as an order identification. Then, after pre-processing is completed, if it is necessary to use a different plate container to carry the pre-processed ingredients, the electronic identification plate may be removed from the second container and clamped onto the plate container instead, which is then handed over to a staff member responsible for the next step. After receiving the plate container, the staff member responsible for the next step can obtain specific order details by reading information of the electronic identification plate so as to carry out subsequent operations. If a steamer or an oven is required for preparation, the electronic identification plate may further be put in the steamer or the oven. In this way, after the preparation is completed, when the electronic identification plate is removed from the steamer or the oven, the information of the electronic identification plate or detailed information of a specific order may be further read, and a corresponding user can be notified to pick up his/her meal, and so on.

In addition, at each step of processing and preparing, each time the information of the electronic identification plate is read, corresponding order identification information and information such as a name of a corresponding step may be submitted to the server. In this way, the server may learn information such as preparation progress corresponding to each order. If an order is associated with data objects corresponding to a plurality of raw materials, for example, a user ordering three raw materials, scallops, a turbot, and a lobster, these three raw materials may correspond to the same order identification. These three raw materials, however, may be contained by different second containers in the raw material storage area. Therefore, the label on the second container may further carry information such as the ID and name of a data object corresponding to a specific raw material. After a specific second container arrives at the processing and preparing area and the information of the electronic identification plate is read, in addition to being associated with an order identification, the information of the electronic identification plate may further be associated with a data object identification in a specific order. In this way, when processing progress information is subsequently submitted to the server at each step of processing and preparing, specific data object information may further be carried. Then, the server may obtain respective processing and preparing progress information for each different data object in the same order.

In implementation, in order to further increase the speed and reduce the dependence on staff members, for the first container, the raw material storage area is further equipped with a mechanical arm device, configured to remove, according to a trigger instruction, a raw material from the corresponding first container and place the raw material in the second container, such that the second container can be conveyed via the conveyor device. In implementation, there may be a plurality of first containers in the raw material storage area, which are respectively used to store different categories of raw materials. As such, each first container may correspond to a mechanical arm, and each mechanical arm may correspond to a respective control switch. When a user needs to select raw materials in a certain first container, the user may start a corresponding mechanical arm through a control switch, and complete a specific operation such as fishing the raw material out of a tank. Alternatively, in another manner, a plurality of first containers may correspond to a mechanical arm. At this time, numbers for each first container may be provided and labeled on the corresponding first containers; and a control area of the mechanical arm may provide a switch such as a respective button corresponding to each number. When a user needs to fetch raw materials from a certain first container, the user may first determine the number of the first container, and then press the button of the corresponding number; the mechanical arm may then move to the corresponding first container to fetch the corresponding raw materials. The fetched raw materials may be directly put into a second container. If the second container is a soft container such as a plastic bag, in order to facilitate the operation of the mechanical arm, the opening of the second container may be done in advance by some devices and supported by a tool, such that the mechanical arm may easily put the fetched raw materials into the second container.

In addition, in implementation, a specific raw material may be sold by portion. In order to facilitate the operation and better improve and achieve unattended operation in the raw material storage area, the selection of raw materials may be further controlled in advance. For example, according to the sizes of fish, three categories: large, medium, and small, may be established in advance. The weight of the fish in each category is about the same or greater than a certain minimum value; and the fish in each category are respectively stored in different first containers. Accordingly, when deciding to place an order, a user may further select a large portion, a medium portion, or a small portion; and raw materials may be removed from a corresponding first container accordingly. Alternatively, in another embodiment, a specific raw material may further be sold by weight. At this time, as shown in FIG. 1, a device such as a weighing machine may further be equipped in the raw material storage area. After a user selects a specific raw material and puts it in a second container, the user may further weigh the selected raw material using a weighing machine first, and then request to generate an order after obtaining a specific weight. In implementation, the weighing machine and the above-described label printer may be made into an integrated machine device, i.e., the functions of weighing and label printing may be achieved by the same device.

As described above, in an optional embodiment, the processing and preparing area may comprise at least two sub-areas, and each sub-area corresponds to a different processing mode, including steaming, grilling, frying, stir-frying, roasting, etc. In order to further improve efficiency, the conveyor device may have at least two conveying channels respectively connected to different sub-areas. That is to say, after selecting a specific raw material, a user may further select a processing mode; and then a corresponding conveying channel may be selected for conveying to a sub-area corresponding to the processing mode. In implementation, the conveying channel may certainly comprise a first conveying channel dedicated to one of the sub-areas, or may further comprise a second conveying channel shared by a plurality of the sub-areas. For example, in implementation, as shown in FIG. 1, there may be two specific conveying channels, one of which may be a dedicated channel provided for "steaming", and the other may be a channel shared by other processing modes, and so on.

In a layout manner, as shown in FIG. 1, the user activity area may be a circular area; the raw material storage area may be located in a central position in the user activity area; and the processing and preparing area is located outside the user activity area. In addition, the user activity area further comprises a dining area, as shown in FIG. 1, and dining equipment in the dining area are arranged around the raw material storage area.

As described above, in implementation, the food establishment may further comprise an order control system for generating an order based on a received order-generating request and data object information corresponding to the selected raw material in the request, and providing detailed information of the order to the second client in the processing and preparing area. Here, the order control system may be implemented by the aforementioned cloud server plus the first client and the second client, or may be implemented by an in-food establishment ERP system, and so on.

In implementation, if the above-described first mode is adopted, a specific order may be generated by the server; and a user may submit, using the first client, a request for generating an order, or may submit, using the second client in the raw material storage area, a request for generating an order. Here, if a request for generating an order is submitted using the first client, the user may open the first client which is pre-logged in during the process of selecting raw materials after entering a physical food establishment; and a selectable data object information page may be provided on the first client. For example, relevant data on the page may further be provided by the server. Then, the user may select data object information corresponding to the selected raw material on the page. For example, one or more raw materials may be selected, and information of one or more data objects may further be selected on the page accordingly. Then, after an instruction prompting that the selection is done is received, a request for generating an order is sent to the server. Since the request is issued by the first client, and the user has previously logged into the first client using his/her own account, the request will carry information such as the user's identification. In addition, the request may further comprise identification of a physical food establishment where the user is located, identification of a selected data object, and so on. Alternatively, in another embodiment, a geometric code may further be pre-set on each first container in the raw material storage area, which carries identification information of a corresponding data object. At this time, the user may further scan a specific geometric code using a function of the first client such as "Scan QR Code" to determine information of a data object corresponding to the selected raw material, and then submit, using the first client, a request for generating an order. After specific data object information is selected using the first client, processing mode information may further be selected. Additionally, in a preferred embodiment, a physical food establishment may provide a user with a plurality of meal-pickup modes. For example, a user may select to pick up a meal at a meal-pickup window, or using a self-service pick-up device, and so on. Therefore, a specific meal-pickup mode may further be selected, and so on. The above-described processing mode information, meal-pickup mode information, and the like may further be included in the request and submitted to the server; the server then provides such information to the second client in the processing and preparing area.

If a request for generating an order is submitted by the third client in the raw material storage area, a terminal device where the third client is located may be connected to a code scanner or comprise a built-in code scanner. On the one hand, the code scanner may be configured to scan a geometric code such as a "member code" presented by a user using the first client, so as to obtain the user's identification information; on the other hand, it may further scan a geometric code on the first container where the user-selected raw material is located, so as to obtain identification information of a selected data object. In addition, information such as a processing mode and a meal-pickup mode may be selected using the third client and submitted to the server. Furthermore, in such manner, the terminal device where the third client is located may further be connected to or comprise a built-in electronic identification plate reader. In this way, in the case where a user selects a raw material contained by a second container, and the second container is equipped with an electronic identification plate, the third client may further obtain information of the electronic identification plate, and may further carry the information of the electronic identification plate at the time of sending a request for generating an order. In this way, in detailed information of an order received by the third client, the information of the electronic identification plate will be bound with an order number, and thus there is no need to perform an information binding operation.

After receiving a specific order-generation request, the server may generate an order according to the information in a request. On the one hand, detailed information of an order may be provided to the second client in the processing and preparing area; on the other hand, it may further be provided to the first client associated with the user. The user may further complete operations such as online payment based on the order.

In addition, as described above, the raw material storage area may further comprise a second container for containing a selected raw material and a label printer; and the conveyor device is configured to convey the second container containing the selected raw material to the processing and preparing area. At this time, the order control system may further be configured to: generate geometric code information carrying order identification information, and provide the same to the label printer for placing a label printed with the geometric code information on the second container, and for the second client to obtain corresponding order information by scanning the label.

Here, in the event that the processing and preparing area comprises at least two sub-areas, and each sub-area corresponds to a different processing mode, detailed information of the order may further include selected processing mode information. Specific processing mode information may be selected by the user. In addition, detailed information of an order may further include meal-pickup mode information.

For example, if the designated meal-pickup mode is to pick up a meal using a self-service device, the order control system may further be configured to generate a corresponding meal-pickup geometric code and provide the meal-pickup geometric code to the first client. Here, the food establishment may comprise a plurality of different types of self-service pick-up machines, for example, one of which may be an enclosed self-service pick-up machine comprising an enclosed storage container, a dispensation controller, and a code scanner. The enclosed storage container is configured to store, in an enclosed manner, a processed and prepared product associated with an order; that is, a user cannot open the door of the container. The code scanner is configured to scan a meal-pickup geometric code to obtain order information; and the dispensation controller is configured to dispense the product corresponding to the order according to the order information obtained by scanning using the code scanner.

Alternatively, the food establishment may further comprise an open self-service pick-up machine comprising an open storage container that comprises a plurality of storage areas; and each of the storage areas corresponds to a prompting device; the open self-service pick-up machine further comprises a controller and a code scanner; the open storage container is configured to store, in an open manner, a processed and prepared product associated with a user order; that is, the difference between the open self-service pick-up machine and the enclosed self-service pick-up machine is that the door of the former may be opened and closed by a user. The code scanner is configured to scan a meal-pickup geometric code to obtain order information; and the controller is configured to store user order identification information corresponding to the finished product placed in the storage area, and control the prompting device associated with the storage area corresponding to the order information to issue prompt information after the code scanner scans to obtain order information. Naturally, the controller may further verify scanning results. If the verification succeeds, i.e., a meal corresponding to the meal-pickup code does exist in the current pick-up machine, the controller controls and opens the door of the pick-up machine, and the user may pick up his/her meal therefrom. Here, the prompting device may refer to an indicator light. When a storage area is selected, a corresponding indicator light is on, and the user may pick up his/her meal according to the prompt of the indicator light. Naturally, an indicator light may further have other embodiments.

The door of an open self-service pick-up machine may be opened and closed by a user. Even though the door may be opened after the user scans a code and passes the verification, after the door is opened, in reality the user may take any goods therefrom. Therefore, such pick-up machine is actually designed based on the trust in users. In order to avoid a deliberate mistake, when the server receives a specific request and if a meal-pickup mode in the request is to pick up a meal from a self-service pick-up machine, the server may further determine, according to the user's credit information, if the user is assigned to pick up a meal from an open self-service pick-up machine. Only when the user's credit meets certain conditions will the user be assigned to pick up a meal from the open self-service pick-up machine; otherwise, a meal will only be picked up from an enclosed self-service pick-up machine. In addition, in practical applications, an open self-service pick-up machine may be placed in a physical food establishment, and an enclosed self-service pick-up machine may be placed outside the physical food establishment. In this way, even if the physical food establishment is closed, users can still pick up their own meals from the enclosed self-service pick-up machine.

It should also be noted that in implementation, the above-described various self-service pick-up machines may be used for not only storing the above-described seafood and other categories of meals, they may also store other types of meals, for example, breakfast, afternoon tea, and so on. In other words, other types of meals ordered by a user may further be stored by the self-service pick-up machine.

In summary, the embodiments of the present specification can improve a food establishment from its hardware layout by setting a raw material storage area in a user activity area, which offers a greater degree in raw material self-fetching, which in turn reduces the dependence on the staff members in the raw material storage area and shortens the waiting time. In addition, an automatic conveyor device is disposed between the raw material storage area and a processing and preparing area, such that the raw material selected by a user can be directly conveyed by the conveyor device to the processing and preparing area, which further reduces the dependence on staff members and helps to shorten the waiting time.

Embodiment 2

The Embodiment 2 provides another food establishment, as shown in FIG. 3, comprising:

a raw material storage area located in a user activity area comprising at least a first container for storing raw materials for selection;

a processing and preparing area, used for the processing and preparing selected raw materials, and wherein the user activity area is located around the raw material storage area, and the processing and preparing area is located around the user activity area.

In an optional embodiment, the user activity area is a circular area, the raw material storage area is located in a central position in the user activity area, and the processing and preparing area is located outside the user activity area.

Here, the food establishment may further comprise:

a conveyor device, located between the raw material storage area and the processing and preparing area, and used for conveying the selected raw materials from the raw material storage area to the processing and preparing area.

In addition, the user activity area may further comprise a dining area, and dining equipment in the dining area are arranged around the raw material storage area.

For other implementations of the Embodiment 2, reference may be made to the description in the above-described Embodiment 1; and details are not repeated herein.

Embodiment 3

Figure 4:
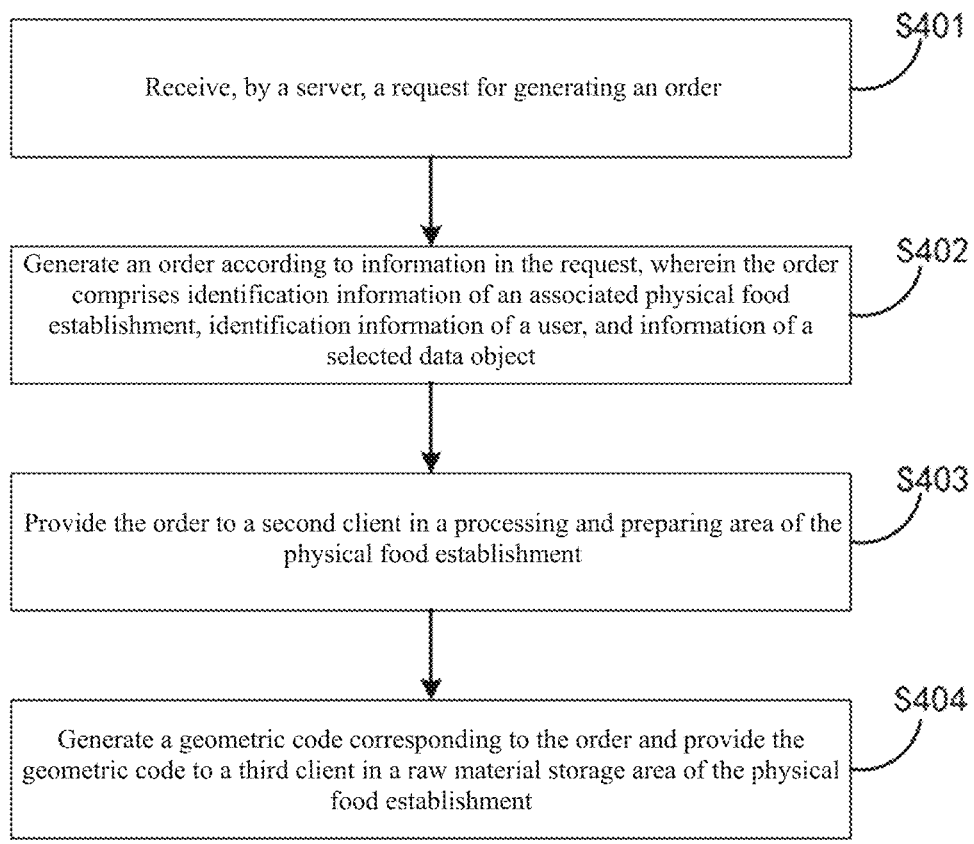
FIG. 4 shows a flow chart of a first method provided according to an embodiment of the present specification.

The Embodiment 3 mainly provides an order information processing method from the perspective of a server of an order control system. As shown in FIG. 4, the method may comprise:

S401: receiving, by a server, a request for generating an order. The server may receive the request from a first client associated with a user. The request may comprise identification information of a food establishment, identification information of the user, and information of a selected data object.

S402: generating an order according to information in the request, wherein the order comprises identification information of an associated physical food establishment, identification information of a user, and information of a selected data object.

S403: providing the order to a second client in a processing and preparing area of the physical food establishment.

S404: generating a geometric code corresponding to the order and providing the geometric code and the information of the selected data object to a third client in a raw material storage area of the physical food establishment; in practical applications, the third client may be associated with a label printer for outputting a label by printing the geometric code information.

For example, the data object corresponds to a raw material stored in a first container in a raw material storage area of the physical food establishment; and after the data object is selected, a corresponding raw material is contained by a second container and conveyed by a conveyor device to a processing and preparing area of the physical food establishment so as to be made into a finished product; and the label is configured to be adhered onto the second container.

In implementation, the server may receive a request for generating an order submitted by a first client, wherein the first client is associated with the user identification information. In this case, prior to receiving a request for generating an order, a request from a first client to browse data object information associated with a target physical food establishment may further be received; and a data object information page is provided to the first client for the to-be-submitted request for generating an order according to a data object selection result on the page. Alternatively, in the event that the first container in the physical food establishment is associated with a geometric code and the geometric code carries data object identification information associated with the raw materials in the first container, the server may further receive code scanning result information submitted by a first client, determine that a code scanning result provides corresponding data object information, and return the data object information to the first client; a request for generating an order by selecting data object information corresponding to the code scanning result may then be submitted.

In addition, the server may further receive a request for generating an order submitted by a third client, wherein the third client corresponds to the raw material storage area. Here, the third client may obtain user identification information by scanning a membership code provided by a first client, obtain selected data object information by scanning a geometric code on a first container, and so on.

In implementation, in the event that a processing and preparing area of the target food establishment comprises at least two sub-areas and each sub-area corresponds to a different processing mode, the server may further provide information of selectable processing modes for a selected data object at the time of receiving data object information selected by a user, such that a target processing mode may be selected. The request for generating an order further includes information of the selected target processing mode. When generating a transaction order, the server may add the information of the target processing mode to detailed information of the order.

Here, for example, the server may obtain, from a third client, waiting time information corresponding to various selectable processing modes in the target physical food establishment. Therefore, for example, when providing information of selectable processing modes for the selected data object, in addition to providing options of selectable processing modes for the selected data object, waiting time information corresponding to various selectable processing modes may further be provided. In this way, a user may select a processing mode based on different waiting times thereof.

In addition, the server may further provide information of selectable meal-pickup modes. At this time, the request for generating an order further includes selected target meal-pickup mode information. At the time of generating an order, the server may further generate a corresponding meal-pickup voucher according to the target meal-pickup mode, and add the meal-pickup voucher to detailed information of the order.

Here, the target meal-pickup mode includes picking up a meal at a meal-pickup window in a processing and preparing area in the physical food establishment; at this time, when a corresponding meal-pickup voucher is generated according to the target meal-pickup mode, a corresponding meal-pickup serial number may be generated according to a serial number used in the target physical food establishment.

Alternatively, the target meal-pickup mode includes picking up a meal at a self-service pick-up device in the physical food establishment. At this time, when a corresponding meal-pickup voucher is generated according to the target meal-pickup mode, a meal-pickup geometric code may be generated according to order identification information. The self-service pick-up device may scan the meal-pickup geometric code to perform authentication on the user.

In addition, the self-service pick-up device may comprise a plurality of different categories. At this time, the server may further determine, according to credit record information of the user associated with the first client, a target category of the self-service pick-up device, and add the target category information to the order.

Furthermore, after providing detailed information of the order to a second client, the server may further receive processing progress information submitted by the second client. In this way, when an order status query request from the first client is received, the processing progress information may further be provided.

Figure 5:
FIG. 5 shows a schematic diagram of a user interface provided according to an embodiment of the present specification.

Here, when a plurality of processing modes are associated with the same order, the processing progress information may include processing progress information corresponding to the plurality of processing modes. In addition, when a plurality of data objects are associated with the same order, the processing progress information may include estimated completion time information corresponding to the plurality of data objects. That is to say, on an order details page of a first client of a user, estimated completion time information corresponding to a plurality of data objects may be respectively provided. For example, as shown in FIG. 5, the estimated completion time for scallops, the turbot, and the Boston lobster is respectively shown. If one of the food items is picked up, the information may further be displayed in order information. A request for generating an order received by the server normally includes data object information corresponding to a raw material that a user selects and a selected specific processing mode; when the server generates a specific order, a raw material identification may be combined with processing mode information to generate specific finished meal name information. For example, assuming that the processing mode selected for "scallops" and "the turbot" is "steaming" and that selected for "Boston lobsters" is "roasting", then as shown in the order in FIG. 5, the specific meal names displayed may include "Steamed Scallops with Garlic", "Steamed Turbot", "Baked Boston Lobster", and so on.

By the server provided in the Embodiment 3, information in a food establishment may be passed around, which further improves the processing and preparing efficiency of meals and shortens the meal-serving time. For other implementations of the steps in the Embodiment 3, reference may be made to the description in the above-described Embodiment 1, and details are not described herein.

Embodiment 4

Figure 6:
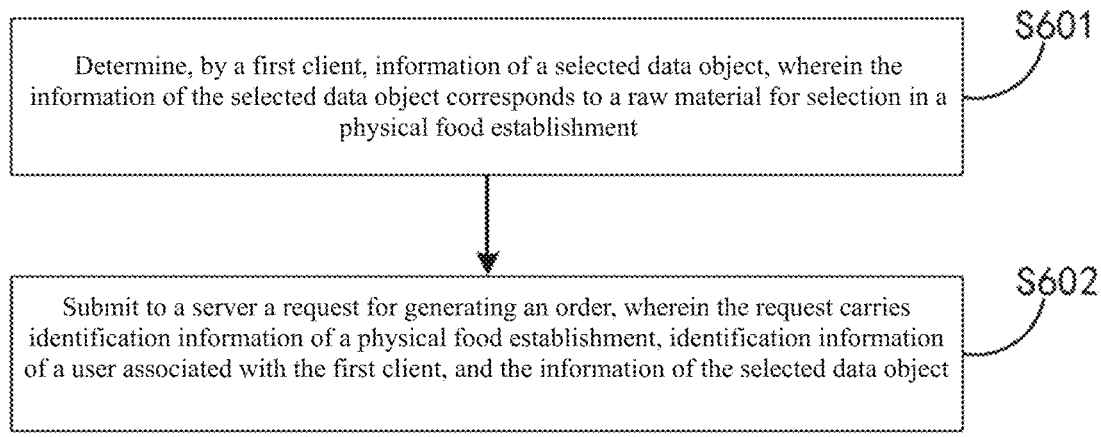
FIG. 6 shows a flow chart of a second method provided according to an embodiment of the present specification.

The Embodiment 4 corresponds to Embodiment 3, and provides an order information processing method from the perspective of a first client. As shown in FIG. 6, the method may comprise:

S601: determining, by a first client, information of a selected data object, wherein the data object information corresponds to a raw material for selection in a physical food establishment; and S602: submitting to a server a request for generating an order, wherein the request carries identification information of the physical food establishment, identification information of a user associated with the first client, and the information of the selected data object, all of which is used for generating an order.

Here, at the time of determining information of a selected data object, it may first determine an identification of a target physical food establishment, and obtain, via the server, information on an selectable data object information page associated with the target physical food establishment, then determine, from the page, information of a selected data object.

Alternatively, in the event that raw materials for selection in the physical food establishment are stored in a first container in a raw material storage area, the first container is associated with a geometric code; and the geometric code carries data object identification information associated with the raw material in the first container; then information of a selected data object may be determined by scanning the geometric code associated with the first container.

For those not described in detail in the Embodiment 4, reference may be made to the description in the above-described Embodiment 3; and details are not repeated herein.

Embodiment 5

Figure 7:
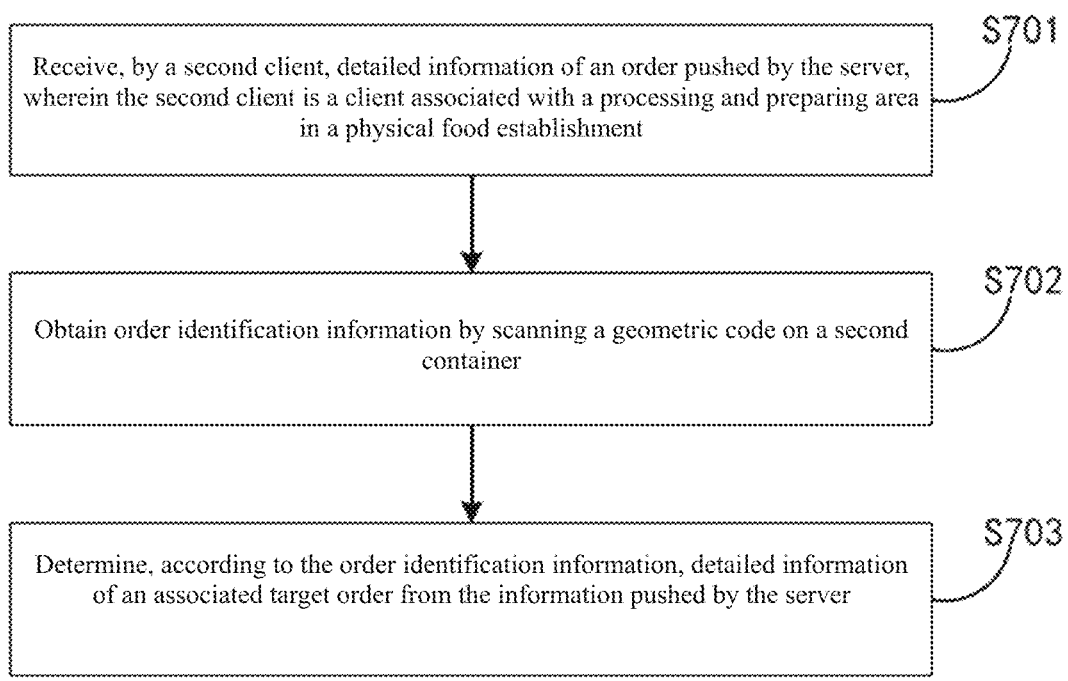
FIG. 7 shows a flow chart of a third method provided according to an embodiment of the present specification.

The Embodiment 5 also corresponds to Embodiment 3, and provides an order information processing method from the perspective of a second client. As shown in FIG. 7, the method may comprise:

S701: receiving, by a second client, detailed information of an order pushed by a server, wherein the second client is a client associated with a processing and preparing area in a physical food establishment; and the detailed information of an order comprises at least order identification information and information of a selected data object; the data object corresponds to a raw material stored in a first container in a raw material storage area of the physical food establishment; and after the data object is selected, a corresponding raw material is contained by a second container and conveyed by a conveyor device to the processing and preparing area of the physical food establishment so as to be made into a finished product; the second client further comprises a label, and the label comprises a geometric code carrying the order identification information;

S702: obtaining the order identification information by scanning the geometric code on the second container; and S703: determining, according to the order identification information, detailed information of an associated target order from the information pushed by the server.

In implementation, the second container further comprises an electronic identification plate; and the electronic identification plate is configured to be moved along with the raw material to each step of processing and preparing; at this time, the second client may further read information of the electronic identification plate on the second container, and bind the information of the electronic identification plate with the order identification information.

In addition, the second client may further obtain, at each step of processing and preparing, corresponding order identification information from the information of the electronic identification plate, and submit to the server processing progress information corresponding to the order.

Embodiment 6

Figure 8:
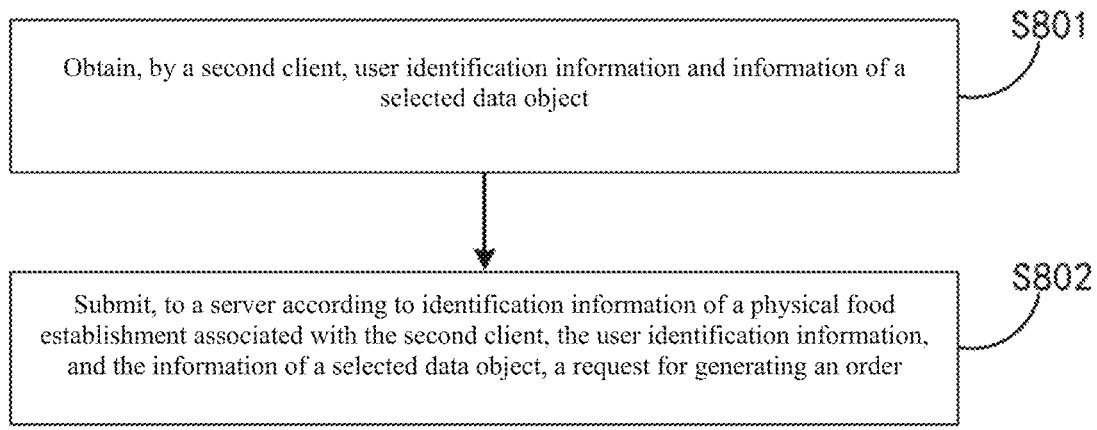
FIG. 8 shows a flow chart of a fourth method provided according to an embodiment of the present specification.

The Embodiment 6 also corresponds to Embodiment 3, and provides an order information processing method from the perspective of a third client. As shown in FIG. 8, the method comprises:

S801: obtaining, by a second client, user identification information and information of a selected data object; and S802: submitting, according to identification information of a physical food establishment associated with the second client, the user identification information, and the information of a selected data object, to a server a request for generating an order, such that the request can be used to generate an order, and providing the order to a processing and preparing area of the physical food establishment.

Here, the data object corresponds to a raw material stored in a first container in a raw material storage area of the physical food establishment; and after the data object is selected, a corresponding raw material is contained by a second container and conveyed by a conveyor device to a processing and preparing area of the physical food establishment so as to be made into a finished product; at this time, geometric code information comprising order identification information returned by a server may further be received; a label is generated and printed according to the geometric code information, and the label is configured to be adhered onto the second container.

In addition, the second container is further equipped with an electronic identification plate; and at the step of submitting to a server a request for generating an order, information of the electronic identification plate may further be read and included in the request, such that the information of the electronic identification plate can be added to detailed information of the order.

For those not described in detail in the above-described Embodiment 5 and Embodiment 6, reference may also be made to the description in the above-described Embodiment 3; and details are not repeated herein.

Figure 9:
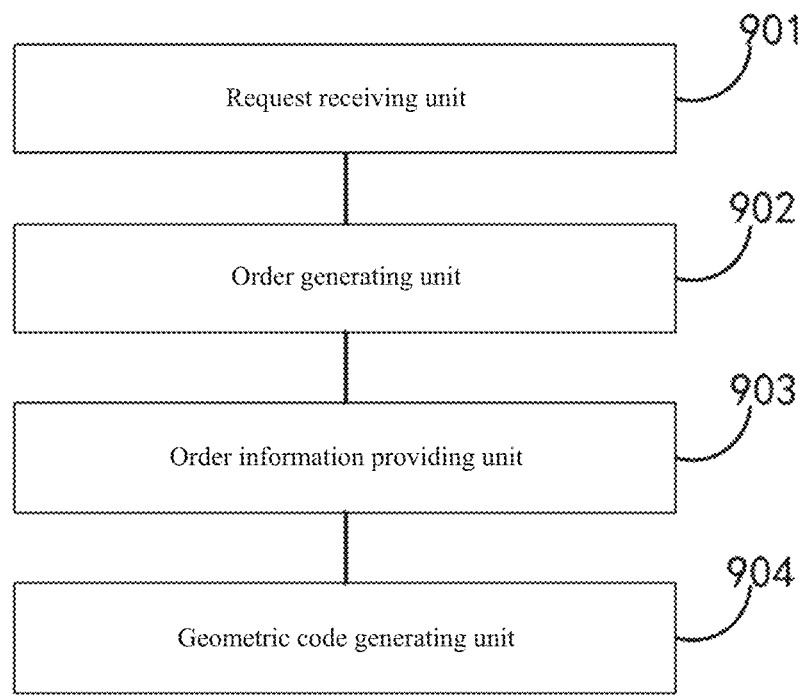
FIG. 9 shows a schematic diagram of a first apparatus provided according to an embodiment of the present specification.

Corresponding to the Embodiment 3, the embodiments of the present specification further provide an order information processing apparatus. As shown in FIG. 9, the apparatus is applicable to a server, comprising:

a request receiving unit 901, configured to receive a request for generating an order;

an order generating unit 902, configured to generate an order according to information in the request, wherein the order comprises identification information of an associated physical food establishment, identification information of a user, and information of a selected data object;

an order information providing unit 903, configured to provide the order to a second client in a processing and preparing area of the physical food establishment; and a geometric code generating unit 904, configured to generate a geometric code corresponding to the order and provide the same to a third client in a raw material storage area of the physical food establishment.

In implementation, the third client is associated with a label printer for outputting a label by printing the geometric code information.

Here, the data object corresponds to a raw material stored in a first container in a raw material storage area of the physical food establishment; and after the data object is selected, a corresponding raw material is contained by a second container and conveyed by a conveyor device to a processing and preparing area of the physical food establishment so as to be made into a finished product; and the label is configured to be adhered onto the second container.

For example, the request receiving unit may be configured to:

receive a request for generating an order submitted by a first client, wherein the first client is associated with the user identification information.

At this time, the apparatus may further comprise:

a browse request receiving unit, configured to receive a request from a first client to browse data object information associated with a target physical food establishment; and a page providing unit, configured to provide a data object information page to the first client for the to-be-submitted request for generating an order according to a data object selection result on the page.

Alternatively, a geometric code is associated with the first container in the physical food establishment; and the geometric code carries data object identification information associated with raw materials in the first container; at this time, the apparatus may further comprise:

a data object information providing unit, configured to receive code scanning result information submitted by a first client, determine that a code scanning result provides corresponding data object information, and return the data object information to the first client, so as to submit a request for generating an order by selecting data object information corresponding to the code scanning result.

In another embodiment, the request receiving unit may be configured to:

receive a request for generating an order submitted by a third client, wherein the third client corresponds to the raw material storage area.

Here, a processing and preparing area of the target food establishment comprises at least two sub-areas, and each sub-area corresponds to a different processing mode; at this time, the apparatus may further comprise:

a selectable processing mode information providing unit, configured to provide information of selectable processing modes for the selected data object such that a target processing mode may be selected, wherein the request for generating an order further includes information of the selected target processing mode; and a processing mode information adding unit, configured to add the target processing mode information to the order.

In addition, the apparatus may further comprise:

a waiting time information obtaining unit, configured to obtain waiting time information corresponding to various selectable processing modes in the target physical food establishment; and the selectable processing mode information providing unit may be configured to: provide options of selectable processing modes for the selected data object and waiting time information corresponding to various selectable processing modes.

In addition, the apparatus may further comprise:

a selectable meal-pickup mode providing unit, configured to provide information of selectable meal-pickup modes, wherein the request for generating an order further includes selected target meal-pickup mode information; and a meal-pickup voucher generating unit, configured to generate a corresponding meal-pickup voucher according to the target meal-pickup mode, and add the meal-pickup voucher to an order.

Here, the target meal-pickup mode includes picking up a meal at a meal-pickup window of a processing and preparing area in the physical food establishment; and the meal-pickup voucher generating unit may be configured to: generate a corresponding meal-pickup serial number according to a serial number used in the target physical food establishment.

Alternatively, the target meal-pickup mode includes picking up a meal at a self-service pick-up device in the physical food establishment; and the meal-pickup voucher generating unit may be configured to: generate a meal-pickup geometric code according to order identification information, such that the self-service pick-up device may scan the meal-pickup geometric code to perform authentication on the user.

Here, the self-service pick-up device comprises a plurality of different categories; and the apparatus may further comprise:

a category determining unit, configured to determine, according to credit record information of the user associated with the first client, a target category of the self-service pick-up device, and add the target category information to the order.

In addition, the apparatus may further comprise:

a processing progress information obtaining unit, configured to receive processing progress information submitted by the second client; and a processing progress information providing unit, configured to provide the processing progress information at the time of receiving an order status query request from the first client.

Here, when a plurality of processing modes are associated with the same order, the processing progress information includes processing progress information corresponding to the plurality of processing modes.

When a plurality of data objects are associated with the same order, the processing progress information includes estimated completion time information corresponding to the plurality of data objects.

Figure 10:
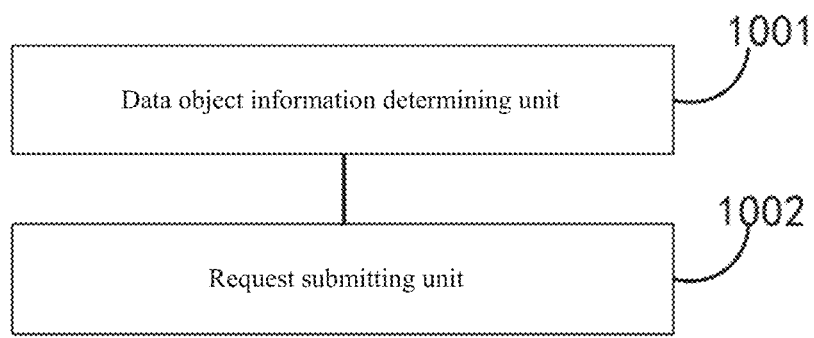
FIG. 10 shows a schematic diagram of a second apparatus provided according to an embodiment of the present specification.

Corresponding to the Embodiment 4, the embodiments of the present specification further provide an order information processing apparatus as shown in FIG. 10. The apparatus is applicable to a first client, comprising:

a data object information determining unit 1001, configured to determine information of a selected data object, wherein the data object information corresponds to a raw material for selection in a physical food establishment; and a request submitting unit 1002, configured to submit to a server a request for generating an order, wherein the request carries identification information of the physical food establishment, identification information of a user associated with the first client, and the information of the selected data object, all of which is used for generating an order.

For example, the data object information determining unit may be configured to:

determine an identification of a target physical food establishment, and obtain, by the server, information on a selectable data object information page associated with the target physical food establishment, and determine, from the page, information of a selected data object.

Alternatively, raw materials for selection in the physical food establishment are stored in a first container in a raw material storage area; the first container is associated with a geometric code, and the geometric code carries data object identification information associated with the raw materials in the first container; and the data object information determining unit may be configured to: determine information of a selected data object by scanning a geometric code associated with the first container.

Figure 11:
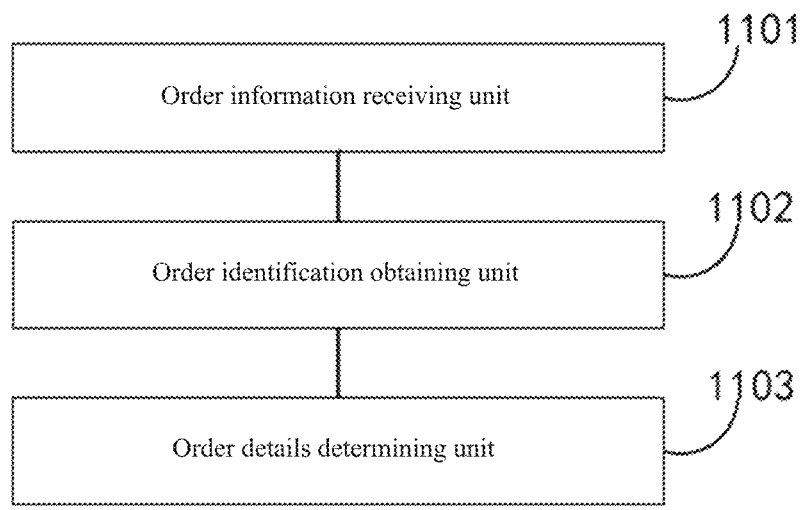
FIG. 11 shows a schematic diagram of a third apparatus provided according to an embodiment of the present specification.

Corresponding to the Embodiment 5, the embodiments of the present specification further provide an order information processing apparatus, as shown in FIG. 11. The apparatus is applicable to a second client, comprising:

an order information receiving unit 1101, configured to receive detailed information of an order pushed by a server, wherein the second client is a client associated with a processing and preparing area in a physical food establishment; and the detailed information of an order comprises at least order identification information and information of a selected data object; the data object corresponds to a raw material stored in a first container in a raw material storage area of the physical food establishment; and after the data object is selected, a corresponding raw material is contained by a second container and conveyed by a conveyor device to a processing and preparing area of the physical food establishment so as to be made into a finished product; the second client further comprises a label, and the label comprises a geometric code carrying the order identification information;

an order identification obtaining unit 1102, configured to obtain the order identification information by scanning the geometric code on the second container; and an order details determining unit 1103, configured to determine, according to the order identification information, detailed information of an associated target order from the information pushed by the server.

Here, the second container further comprises an electronic identification plate, and the electronic identification plate is configured to be moved along with the raw material to each step of processing and preparing; and the apparatus may further comprise:

an electronic identification plate information reading unit, configured to read information of the electronic identification plate on the second container; and an information binding unit, configured to bind information of the electronic identification plate with the order identification information.

In addition, it may further comprise:

a processing progress information submitting unit, configured to obtain, at each step of processing and preparing, corresponding order identification information from the information of the electronic identification plate, and submit to the server processing progress information corresponding to the order.

Figure 12:
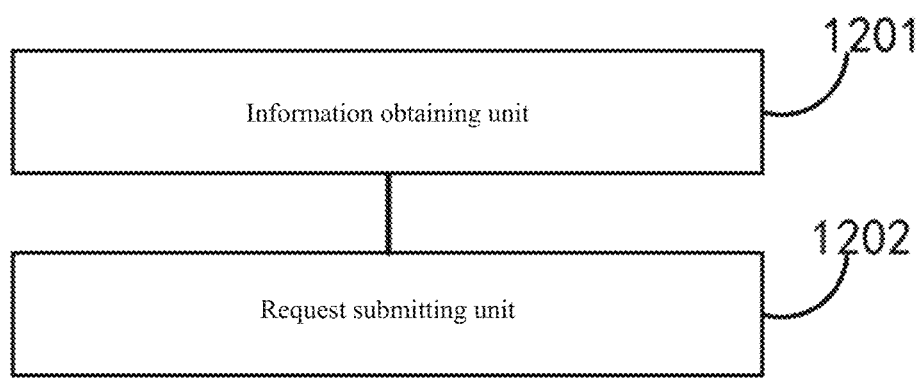
FIG. 12 shows a schematic diagram of a fourth apparatus provided according to an embodiment of the present specification.

Corresponding to the Embodiment 6, the embodiments of the present specification further provide an order information processing apparatus, as shown in FIG. 12. The apparatus is applicable to a second client, comprising:

an information obtaining unit 1201, configured to obtain user identification information and information of a selected data object; and a request submitting unit 1202, configured to submit, according to identification information of a physical food establishment associated with the second client, the user identification information, and the information of a selected data object, to a server a request for generating an order, such that the request can be used to generate an order, and provide the order to a processing and preparing area of the physical food establishment.

Here, the data object corresponds to a raw material stored in a first container in a raw material storage area of the physical food establishment; and after the data object is selected, a corresponding raw material is contained by a second container and conveyed by a conveyor device to a processing and preparing area of the physical food establishment so as to be made into a finished product; and the apparatus may further comprise:

a geometric code information receiving unit, configured to receive geometric code information including order identification information returned by a server; and a label printing unit, configured to generate and print a label according to the geometric code information, and the label is used to be adhered onto the second container.

Here, the second container is further equipped with an electronic identification plate; and the request submitting unit may further be configured to:

read information of the electronic identification plate, and carry the information of the electronic identification plate in the request, such that the information of the electronic identification plate may be added to detailed information of the order.

Embodiment 7

Figure 13:
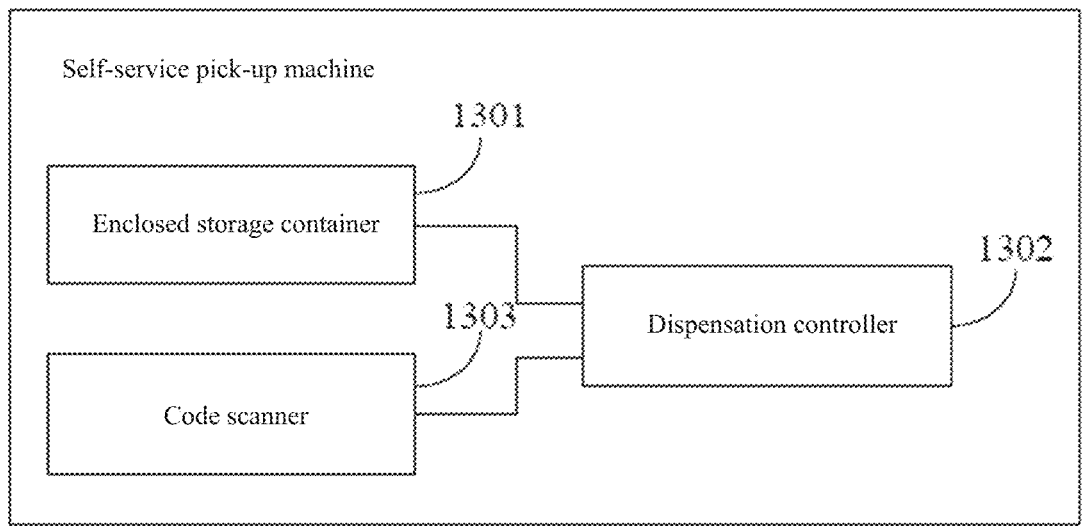
FIG. 13 shows a schematic diagram of a self-service pick-up machine provided according to an embodiment of the present specification.

The Embodiment 7 further provides a self-service pick-up machine, as shown in FIG. 13. The self-service pick-up machine may comprise an enclosed storage container 1301, a dispensation controller 1302, and a code scanner 1303, wherein the enclosed storage container 1301 is configured to store, in an enclosed manner, a processed and prepared product associated with an order;

the code scanner 1303 is configured to scan a meal-pickup geometric code to obtain order information; and the dispensation controller 1302 is configured to dispense the product corresponding to the order according to the order information obtained by scanning using the code scanner.

Embodiment 8

Figure 14:
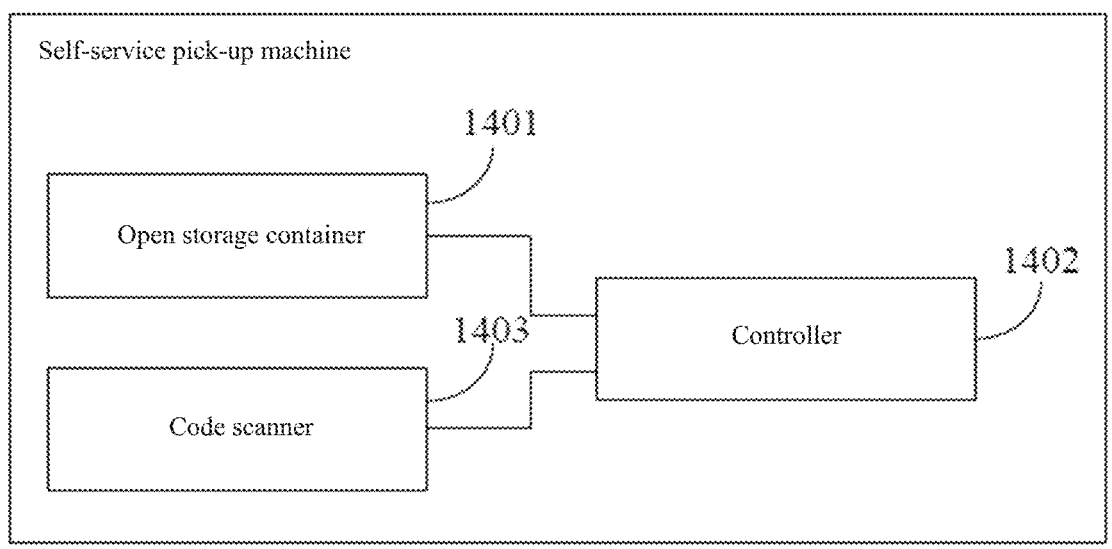
FIG. 14 shows a schematic diagram of another self-service pick-up machine provided according to an embodiment of the present specification.

The Embodiment 8 provides another self-service pick-up machine, as shown in FIG. 14. The self-service pick-up machine may comprise an open storage container 1401 that comprises a plurality of storage areas, and each of the storage areas corresponds to a prompting device; and the self-service pick-up machine further comprises a controller 1402 and a code scanner 1403, wherein the open storage container 1401 is configured to store, in an open manner, a processed and prepared product associated with an order;

the code scanner 1403 is configured to scan a meal-pickup geometric code to obtain order information; and the controller 1402 is configured to store user order identification information corresponding to the product placed in the storage area, and control a prompting device associated with the storage area corresponding to the order information to issue prompt information after the code scanner scans to obtain order information.

In implementation, the self-service pick-up machine may further comprise a cabinet door and an electronic lock. At this time, the controller may further be configured to unlock the electronic lock and open the cabinet door after the code scanner scans and obtains order information and successfully verifies the order information. In addition, the prompting device may be in a plurality of forms, for example, an indicator light may be comprised.

For implementations in the above-described Embodiments 7 and 8, reference may be made to the description in the above-described embodiments; and details are not repeated herein.

In addition, the embodiments of the present specification further provide a computer system for an electronic device, comprising:

one or more processors; and a memory associated with the one or more processors, wherein the memory is configured to store program instructions which, when read and executed by the one or more processors, perform the following operations:

receiving a request for generating an order;

generating an order according to information in the request, wherein the order comprises identification information of an associated physical food establishment, identification information of a user, and information of a selected data object;

providing the order to a second client in a processing and preparing area of the physical food establishment; and generating a geometric code corresponding to the order and providing the same to a third client in a raw material storage area of the physical food establishment.

Figure 15:
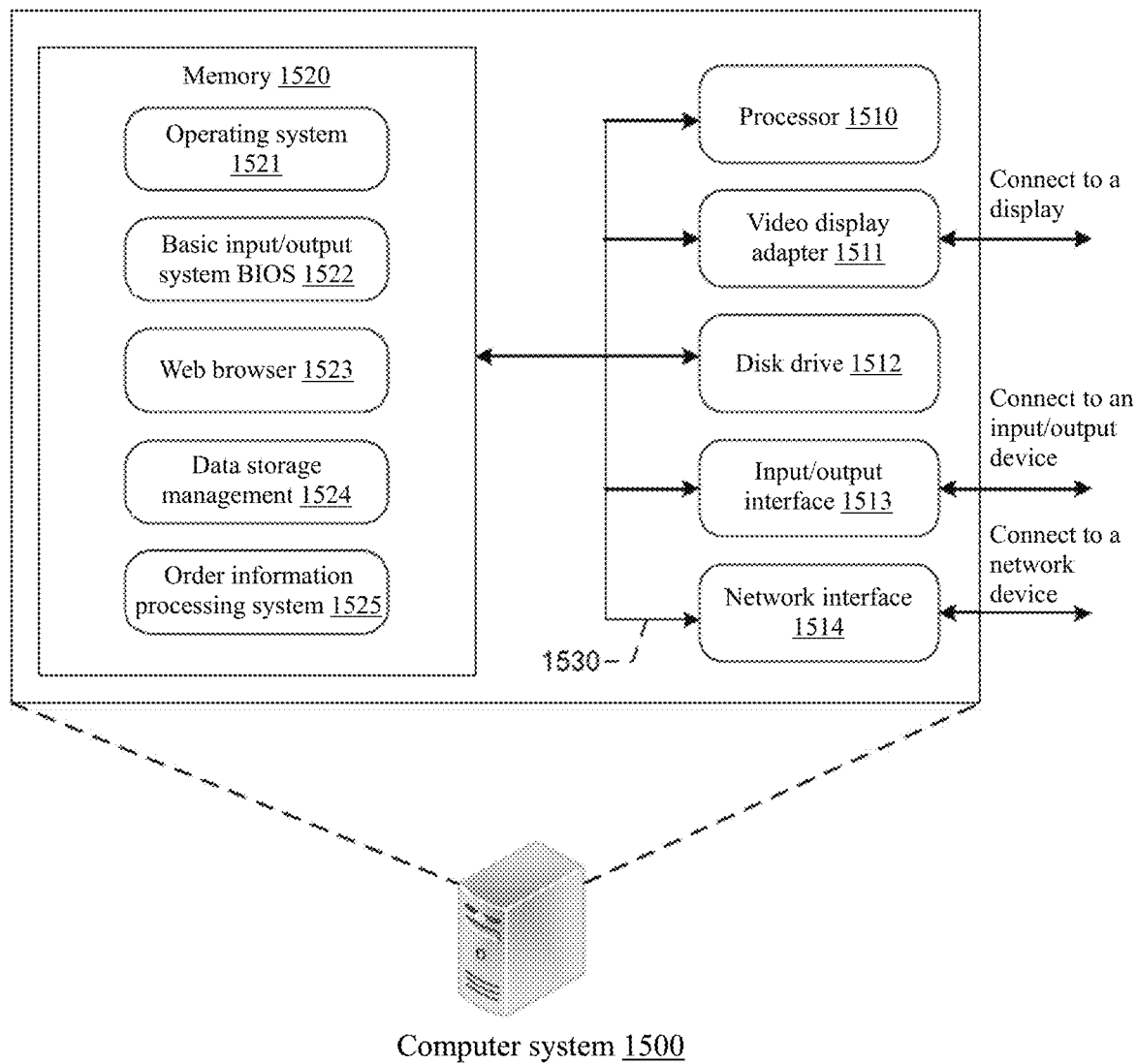
FIG. 15 shows a schematic diagram of a computer system provided according to an embodiment of the present specification.

Here, as an example, FIG. 15 shows an architecture of a computer system, comprising a processor 1510, a video display adapter 1511, a disk drive 1512, an input/output interface 1513, a network interface 1514, and a memory 1520. The above-described processor 1510, video display adapter 1511, disk drive 1512, input/output interface 1513, network interface 1514, and memory 1520 may be connected for communication via a communication bus 1530.

Here, the processor 1510 may be implemented by a general-purpose central processing unit (CPU), a microprocessor, an application specific integrated circuit (ASIC), or one or more integrated circuits for executing related programs, so as to implement the technical solutions provided in the present specification.

The memory 1520 may be implemented in the form of a ROM (Read Only Memory), a RAM (Random Access Memory), a static storage device, or a dynamic storage device. The memory 1520 may store an operating system 1521 for controlling the running of a computer system 1500, and a basic input/output system (BIOS) for controlling low-level operations of the computer system 1500. In addition, it may further store a web browser 1523, a data storage management system 1524, and an order information processing system 1525, and so on. The above-described order information processing system 1525 may be an application program that implements the operations of the above-described steps in the embodiments of the present specification. In summary, when the technical solutions provided in the present specification are implemented by software or firmware, relevant program codes are stored in the memory 1520 and are called and executed by the processor 1510.

The input/output interface 1513 is configured to be connected to an input/output module, so as to implement information input and output. The input/output module may be disposed in a device as a component (not shown in the figure), or it may be externally connected to the device to provide corresponding functions. Here, an input device may comprise a keyboard, a mouse, a touch screen, a microphone, various sensors, etc., and an output device may comprise a display, a speaker, a vibrator, an indicator light, etc.

The network interface 1514 is configured to be connected to a communication module (not shown in the figure), so as to implement communication interaction between the device and other devices. Here, the communication module may implement communication in a wired mode (for example, USB, network cable, etc.), and may further implement communication in a wireless mode (for example, mobile network, WIFI, Bluetooth, etc.).

The bus 1530 comprises a path for transferring information among various components (for example, the processor 1510, the video display adapter 1511, the disk drive 1512, the input/output interface 1513, the network interface 1514, and the memory 1520) of a device.

In addition, the computer system 1500 may further obtain information of specific receiving conditions from a virtual resource object receiving condition information database 1541, so as to perform condition determination, and so on.

It should be noted that although the above-described device only shows the processor 1510, the video display adapter 1511, the disk drive 1512, the input/output interface 1513, the network interface 1514, the memory 1520, the bus 1530, etc., in an implementation process, the device may further comprise other components necessary to achieve normal operation. In addition, those skilled in the art may understand that the above-described device may comprise only the components necessary to implement the embodiments of the present specification, and does not necessarily comprise all the components shown in the figure.

From the description of the above embodiments, those skilled in the art can clearly understand that the present specification may be implemented by means of software plus a necessary universal hardware platform. Based on such an understanding, the technical solutions of the present specification essentially or the part contributing to the current technologies may be implemented in a form of a software product. The computer software product may be stored in a storage medium, such as a ROM/RAM, a disk and a CD, and include several instructions for instructing a computer device (which may be a personal computer, a server, or a network device, etc.) to execute the methods described in the embodiments of the present specification or certain parts of the embodiments.

When the functions disclosed herein are implemented in the form of software functional units and sold or used as independent products, they can be stored in a processor executable non-volatile computer readable storage medium. Particular technical solutions disclosed herein (in whole or in part) or aspects that contributes to current technologies may be embodied in the form of a software product. The software product may be stored in a storage medium, comprising a number of instructions to cause a computing device (which may be a personal computer, a server, a network device, and the like) to execute all or some steps of the methods of the embodiments. The storage medium may comprise a flash drive, a portable hard drive, ROM, RAM, a magnetic disk, an optical disc, another medium operable to store program code, or any combination thereof.

Particular embodiments further provide a system comprising a processor and a non-transitory computer-readable storage medium storing instructions executable by the processor to cause the system to perform operations corresponding to steps in any method of the embodiments disclosed above. Particular embodiments further provide a non-transitory computer-readable storage medium configured with instructions executable by one or more processors to cause the one or more processors to perform operations corresponding to steps in any method of the embodiments disclosed above.

The embodiments of this description are all described in a progressive manner; the same or similar parts in the embodiments can be referred to one another; and each embodiment emphasizes a point different from other embodiments. Particularly, the system or system embodiments are basically similar to the method embodiments, and are thus described in a more concise manner. The relevant portions can refer to the descriptions in the method embodiments. The above-described system and system embodiments are merely illustrative, wherein the units described as separate components may or may not be physically separated, and components displayed as units may or may not be physical units, i.e., may be located in one place, or may be distributed to a plurality of network elements. Some or all of the modules may be selected according to actual needs to achieve the objects of the solutions of the embodiments. Those skilled in the art may understand and implement the above without creative efforts.

A food establishment and an order information processing method and apparatus provided in the present specification have been described in detail above. Examples are used herein to illustrate the principle and embodiments of the present specification. The description of the above embodiments is merely used to help those skilled in the art to understand the methods of the present specification and its core ideas. Meanwhile, for those skilled in the art, according to the idea of the present specification, there will be changes in the detailed description and application scope. In summary, the content of the present description shall not be construed as a limitation on the present specification.

The invention claimed is:

1. A computer-implemented method for processing order information, comprising:
    obtaining, by a server, waiting time information corresponding to at least two processing modes, wherein a processing and preparing area of a food establishment comprises at least two sub-areas respectively corresponding to the at least two processing modes;
    providing, by the server to a first client associated with a user, the waiting time information associated with the at least two processing modes;

receiving, by the server from the first client, a request for generating an order, the request comprising identification information of the food establishment, identification information of the user, information of a selected data object, and a different data object corresponding to a selected processing mode of the at least two processing modes, wherein the selected data object comprises identification information of a raw material stored in a raw material storage area;

generating, by the server, the order based on the request;

sending, by the server, the order to a second client associated with the processing and preparing area of the food establishment;

generating, by the server, a geometric code encoding identification information of the generated order;

sending, by the server to a third client associated with the raw material storage area of the food establishment, the generated geometric code and the information of the selected data object;

printing, by the third client via a label printer, the geometric code on a label;

adhering, by the third client, the label to a container containing the raw material; and conveying, by a conveyor device, the container containing the raw material from the raw material storage area to the processing and preparing area.

2. The method of claim 1, further comprising:

scanning, by the second client, the label to obtain the identification information of the identified order; and identifying, by the second client, the order from a plurality of orders received from the server.

3. The method of claim 1, wherein, prior to receiving the request for generating the order, further comprising:

receiving, by the server from the first client, a request to browse a plurality of data objects associated with the food establishment; and sending, by the server to the first client, information of the plurality of data objects for selection.

4. The method of claim 1, prior to receiving the request for generating the order, further comprising:

receiving, by the server from the first client, a geometric code scanning result generated by scanning a geometric code label on a different container containing a raw material in the raw material storage area;

determining, by the server, the selected data object based on the geometric code scanning result; and returning, by the server to the first client, the selected data object.

5. The method of claim 1, wherein:

the generating the order based on the request comprises including information of the different data object in the order.

6. The method of claim 1, further comprising:

providing, by the server to the first client, information of a plurality of meal-pickup modes, wherein the request for generating the order further comprises a different data object corresponding to a selected meal-pickup mode; and generating, by the server, a meal-pickup voucher corresponding to the selected meal-pickup mode; and adding, by the server, the meal-pickup voucher to the order.

7. The method of claim 6, wherein:

the selected meal-pickup mode comprises meal pickup at a meal-pickup window of the processing and preparing area in the food establishment; and the meal-pickup voucher comprises a serial number of the food establishment.

8. The method of claim 6, wherein:

the selected meal-pickup mode comprises meal pickup at a self-service pickup device in the food establishment;

the generating the meal-pickup voucher comprises generating a different geometric code based on the identification information of the order, wherein the different geometric code is scannable by the self-service pickup device for user authentication.

9. The method of claim 1, further comprising:

receiving, by the server from the second client, processing progress information associated with the order; and sending, by the server to the first client, the processing progress information.

10. A system for processing order information, comprising a processor and a non-transitory computer-readable storage medium storing instructions executable by the processor to cause the system to perform operations comprising:

obtaining waiting time information corresponding to at least two processing modes, wherein a processing and preparing area of a food establishment comprises at least two sub-areas respectively corresponding to the at least two processing modes;

providing, to a first client associated with a user, the waiting time information associated with the at least two processing modes;

receiving, from the first client, a request for generating an order, the request comprising identification information of the food establishment, identification information of the user, information of a selected data object, and a different data object corresponding to a selected processing mode of the at least two processing modes, wherein the selected data object comprises identification information of a raw material stored in a raw material storage area;

generating the order based on the request;

sending the order to a second client associated with the processing and preparing area of the food establishment;

generating a geometric code encoding identification information of the generated order; and sending, to a third client associated with a raw material storage area of the food establishment, the generated geometric code and the information of the selected data object, wherein the sending the generated geometric code and the information of the selected data object causes the third client to print the geometric code on a label via a label printer and adhere the label to a container containing the raw material, and causes a conveyor device to convey the container containing the raw material from the raw material storage area to the processing and preparing area.

11. The system of claim 10, wherein, prior to receiving the request for generating the order, the operations further comprise:

receiving, from the first client, a request to browse a plurality of data objects associated with the food establishment; and sending, to the first client, information of the plurality of data objects for selection.

12. The system of claim 10, prior to receiving the request for generating the order, the operations further comprise:

receiving, from the first client, a geometric code scanning result generated by scanning a geometric code label on a different container containing a raw material in the raw material storage area;

determining the selected data object based on the geometric code scanning result; and returning, to the first client, the selected data object.

13. The system of claim 10, wherein:

the generating the order based on the request comprises including information of the different data object in the order.

14. The system of claim 10, further comprising:

providing, to the first client, information of a plurality of meal-pickup modes, wherein the request for generating the order further comprises a different data object corresponding to a selected meal-pickup mode; and generating a meal-pickup voucher corresponding to the selected meal-pickup mode; and adding the meal-pickup voucher to the order.

15. The system of claim 14, wherein:

the selected meal-pickup mode comprises meal pickup at a meal-pickup window of the processing and preparing area in the food establishment; and the meal-pickup voucher comprises a serial number of the food establishment.

16. A non-transitory computer-readable storage medium for processing order information, configured with instructions executable by one or more processors to cause the one or more processors to perform operations comprising:

obtaining waiting time information corresponding to at least two processing modes, wherein a processing and preparing area of a food establishment comprises at least two sub-areas respectively corresponding to the at least two processing modes;

providing, to a first client associated with a user, the waiting time information associated with the at least two processing modes;

receiving, from the first client, a request for generating an order, the request comprising identification information of the food establishment, identification information of the user, information of a selected data object, and a different data object corresponding to a selected processing mode of the at least two processing modes, wherein the selected data object comprises identification information of a raw material stored in a raw material storage area;

generating the order based on the request;

sending the order to a second client associated with the processing and preparing area of the food establishment;

generating a geometric code encoding identification information of the generated order; and sending, to a third client associated with a raw material storage area of the food establishment, the generated geometric code and the information of the selected data object, wherein the sending the generated geometric code and the information of the selected data object causes the third client to print the geometric code on a label via a label printer and adhere the label to a container containing the raw material, and causes a conveyor device to convey the container containing the raw material from the raw material storage area to the processing and preparing area.

* * * * *